United States Patent
Gegner et al.

(10) Patent No.: US 9,273,727 B2
(45) Date of Patent: Mar. 1, 2016

(54) METHOD FOR PRODUCING A TRACK ELEMENT OF A BEARING ASSEMBLY

(71) Applicant: AKTIEBOLAGET SKF, Göteborg (SE)

(72) Inventors: Juergen Gegner, Forchheim (DE); Udo Krug, Theres (DE); Armin Olschewski, Schweinfurt (DE); Arno Stubenrauch, Aidhausen (DE)

(73) Assignee: AKTIEBOLAGET SKF, Gothenburg (SE)

(*) Notice: Subject to any disclaimer, the term of this patent is extended or adjusted under 35 U.S.C. 154(b) by 22 days.

(21) Appl. No.: 14/354,178

(22) PCT Filed: Oct. 25, 2012

(86) PCT No.: PCT/EP2012/071167
§ 371 (c)(1),
(2) Date: Apr. 25, 2014

(87) PCT Pub. No.: WO2013/060783
PCT Pub. Date: May 2, 2013

(65) Prior Publication Data
US 2015/0036960 A1 Feb. 5, 2015

(30) Foreign Application Priority Data
Oct. 26, 2011 (DE) .................. 10 2011 085 205

(51) Int. Cl.
| F16C 19/36 | (2006.01) |
| F16C 33/58 | (2006.01) |
| B23P 15/00 | (2006.01) |
| C21D 9/40 | (2006.01) |
| F16C 33/64 | (2006.01) |
| C21D 1/02 | (2006.01) |
| F16C 19/24 | (2006.01) |

(52) U.S. Cl.
CPC ............. *F16C 33/585* (2013.01); *B23P 15/003* (2013.01); *C21D 1/02* (2013.01); *C21D 9/40* (2013.01); *F16C 19/24* (2013.01); *F16C 33/64* (2013.01); *F16C 19/364* (2013.01); *Y10T 29/49689* (2015.01)

(58) Field of Classification Search
CPC ...... F16C 33/64; F16C 33/58; F16C 2223/02; B23P 15/003
See application file for complete search history.

(56) References Cited

U.S. PATENT DOCUMENTS 5,658,082 A * 8/1997 Tsushima et al. ............. 384/492
2003/0193120 A1 10/2003 Gegner
(Continued)

FOREIGN PATENT DOCUMENTS

DE 10 2007 055575 A1 6/2009

OTHER PUBLICATIONS

English translation of International Search Report for parent application No. PCT/EP2012/071167.

*Primary Examiner* — Thomas R. Hannon
(74) *Attorney, Agent, or Firm* — Bryan Peckjian; SKF USA Inc. Patent Dept.

(57) ABSTRACT

A method for manufacturing a raceway element of a bearing assembly includes hardening a raceway element having a raceway surface by at least partially heating the raceway element, deep rolling the raceway surface using a first rolling element, and then deep rolling the raceway surface using a second rolling element. The first rolling element has at least one different dimension than the second rolling element. In the resulting raceway element, compressive residual stresses of at least 400 MPa are present at a depth from the raceway surface of 200 μm or less, and between the raceway surface and a depth of 100 μm from the raceway surface, the amount of the compressive residual stresses changes by 500 MPa or less.

15 Claims, 2 Drawing Sheets

(56) References Cited

U.S. PATENT DOCUMENTS

| | | |
|---|---|---|
| 2005/0160602 A1 | 7/2005 | Shibata et al. |
| 2006/0056754 A1* | 3/2006 | Beer et al. .................... 384/625 |
| 2007/0006944 A1* | 1/2007 | Waseda et al. ............... 148/320 |
| 2010/0021101 A1 | 1/2010 | Endres et al. |

\* cited by examiner

METHOD FOR PRODUCING A TRACK ELEMENT OF A BEARING ASSEMBLY

CROSS-REFERENCE

This application is the U.S. national stage of International Patent Application No. PCT/EP2012/071167 filed on Oct. 25, 2012, which claims priority to German Patent Application No. 10 2011 085 205.0 filed on Oct. 26, 2011.

TECHNICAL FIELD

The invention relates to a method for manufacturing a raceway element of a bearing assembly, and to a raceway element of a bearing assembly.

RELATED ART

With the use of rolling-element bearings, there are various damage mechanisms which can negatively influence the service life of the rolling-element bearing. Due to material fatigue on and below the raceway of a rolling-element bearing, for example microstructural changes and cracks can arise due to the cyclical stress in the Hertzian micro- or macro-contact due to being continuously rolled on by the rolling elements, which microstructural changes and cracks can subsequently lead to the failure of the rolling-element bearing. Moreover, under the influence of mixed friction in the rolling-element contact for example, cleavage-fracture-like, brittle forced-rupture cracks can be initiated on the raceway surfaces, which e.g. grow into the depth of the material promoted by penetrating, aged lubricant driven by corrosion-fatigue and can ultimately lead to raceway peeling due to return of cracks to the surface as well as material separation at the crack edges. Especially the last-mentioned mechanism of corrosion-fatigue can lead to premature failures of rolling-element bearings up to well before the nominal L10 life (90% survival probability). By forming compressive residual stresses on and below the surface of the raceway using known methods such as hard turning and other case-strengthening methods, it is possible to hinder the formation and spreading of cracks of this type.

SUMMARY

According to one aspect of the present teachings, disclosed are a raceway element of a rolling-element bearing assembly and a method for manufacturing the raceway element, which raceway element has an increased service life compared to known rolling-element bearing assemblies.

In another aspect of the present teachings, disclosed is a method for manufacturing a raceway element of a bearing assembly, comprising:

Providing a raceway element including a raceway,

Hardening the raceway by at least partial heating of the raceway element,

Deep rolling the raceway using a first rolling element and

Deep rolling the raceway using a second rolling element, wherein the second rolling element has at least one different dimension compared to the first rolling element.

According to another aspect of the present teachings, it is noted that a particularly advantageous alteration of the residual-stress state and the microstructure on and near the surface of the raceway element can be achieved by deep rolling the surface of the raceway element using at least two differently dimensioned rolling elements. Residual stresses of the first type (macro residual stresses) are referred to here in the usual manner as "residual stresses." The formation of compressive residual stresses below the surface of metals can be achieved by deep rolling, i.e. the material can be cold-worked. In general here, according to von Mises, compressive residual stresses are established directly on the surface to a certain degree which intensifies with increasing depth up to a maximum value. With further increasing depth the amount of the compressive residual stress then decreases again. In hardened steels, compressive residual stresses can typically be generated in significant values up to a depth range of several 100 μm. However in known methods of deep rolling, there is a relatively large difference between the amount of the maximum value of the compressive residual stresses and the amount of the compressive residual stresses on the surface or at shallow depths of approximately 10 μm or a few 10 μm. Up to the maximum value of the compressive residual stress at the location of the highest von Mises stress for the Hertzian (macro) contact with the rolling elements, the amount of the compressive residual stresses thus drops relatively sharply towards the surface. In order to build up a sufficient amount of compressive residual stresses during deep rolling, both on and very close to the surface up to a typical depth of several 10 μm, as well as at greater depths of typically several 100 μm, it is advantageously possible to work with rolling elements of different diameters. An optimal residual stress distribution between the surface and the maxima or the coalescing maximum of the compressive residual stresses can be intentionally set using alternating deep rolling of the raceway with two or more differently sized rolling elements, whereby a compressive residual stress sufficiently approaching the maximum value can already be generated at shallower depths up to, for example, 100 μm. Plastification and compressive residual stress buildup are closely associated with the geometry of the rolling elements used in deep rolling. In addition to the compressive residual stress buildup, dislocation glide during the plastic deformation leads to the formation of energetically favorable dislocation arrangements (e.g. dislocation multipoles) which stabilizes the microstructure of the material.

In a preferred embodiment of the invention, both rolling elements have a spherical or cylindrical shape and different diameters. Alternatively, mixed applications of cylinders or spherical rolling elements having different diameters are also possible.

After the deep rolling with the second rolling element, a material-ablating method step can advantageously be initiated, wherein the surface of the raceway element is partially removed in the region of the raceway. This is particularly advantageous if the surface roughness was increased by the deep-rolling step such that the quality in the bearing contact is no longer sufficient for a good bearing operation. Here a honing- or gentle-grinding process is particularly advantageous, for example vibratory finishing, wherein less than 50 μm of material is removed from the surface in order to substantially maintain the depth range of the built-up compressive residual stresses.

A final thermal post-treatment of at least the raceway of the raceway element at a temperature which is less than the tempering or annealing temperature in martensitic or banitic hardening is also advantageous. This post-heating acts to stabilize the microstructure of the material in the mechanically influenced case, which stabilization is detectable, for example, by the decrease of the radiographic line width, and can take place in air or in a chemically inert environment (e.g. vacuum, protecting gas, salt bath). With a typical duration of the thermal post-treatment of approximately 1 hour, a loss of hardness can be counteracted by the chosen temperature range.

Further advantages and designs of the invention result from the exemplary embodiment of the invention described hereinafter with reference to the accompanying Figures:

BRIEF DESCRIPTION OF THE DRAWINGS

The inventive raceway element can in particular be used in highly loaded tapered-roller- or cylindrical-roller-bearing-assemblies, such as are used for example in wind turbine applications, other industrial drives or ship engines. FIG. 1 shows a tapered roller bearing as an exemplary embodiment of the invention in the form of a schematic diagram. Here the tapered roller bearing comprises an outer raceway element 20 and an inner raceway element 10, between which are disposed rolling elements 30 formed as truncated cones. Here the rolling elements 30 can be disposed in a not-shown cage, and appropriate seals can be provided between the two raceway elements 10 and 20 for sealing a space containing the rolling elements 30. Here the rolling elements 30 are provided for rolling on the rolling raceways 12 and 22 incorporated in the raceway elements 10 and 20. Of course, in other embodiments a multi-row rolling-element bearing and/or cylindrical roller bearing, ball bearing, barrel roller bearing, spherical roller bearing, and any other rolling-element bearing type can also be used.

DETAILED DESCRIPTION OF THE INVENTION

In exemplary embodiments of the invention it is advantageous to more uniformly design the profile of the compressive residual stresses from the surface up to in the region of the compressive residual stress maximum in the depth than is possible using known methods such as shot peening, hard turning, or conventional deep-rolling processes. This is achieved in particular in that after the hardening of the raceway of the raceway element, two deep rolling steps are carried out using different rolling elements. Here for example two ceramic or cemented carbide balls of different diameters are rolled one-after-the-other over the raceway, whereby compressive residual stresses are generated. Depending on the geometry of the rolling elements, the compressive residual stresses preferably build up at different depths. Here the depth profile follows the distribution of the von Mises stress, wherein with repeated rolling-overs a superimposition takes place with the already-generated compressive residual stresses. Overall, a superimposed compressive residual stress profile results from the two or more separate deep-rolling processes, wherein a compressive residual stress relatively close to the maximum amount already occurs at a shallow depth. In contrast thereto, with shot peening, deep rolling with only one rolling element, or hard turning, the amount of the compressive residual stress decreases relatively more sharply at a shallow depth. This sharp decrease within a shallow depth of for example 50 µm or 100 µm, depending on the method used, disadvantageously affects the service life of the raceway element in particular when surface-induced, normal-stress-controlled crack formation (e.g. due to frictional-tensile stresses) occurs. By deep rolling the raceway with two differently sized rolling elements, the profile of the compressive residual stresses can better approach, up to the maximum value, the ideal profile of a constant compressive residual stress with decreasing depth in comparison to known methods.

Figure 1:
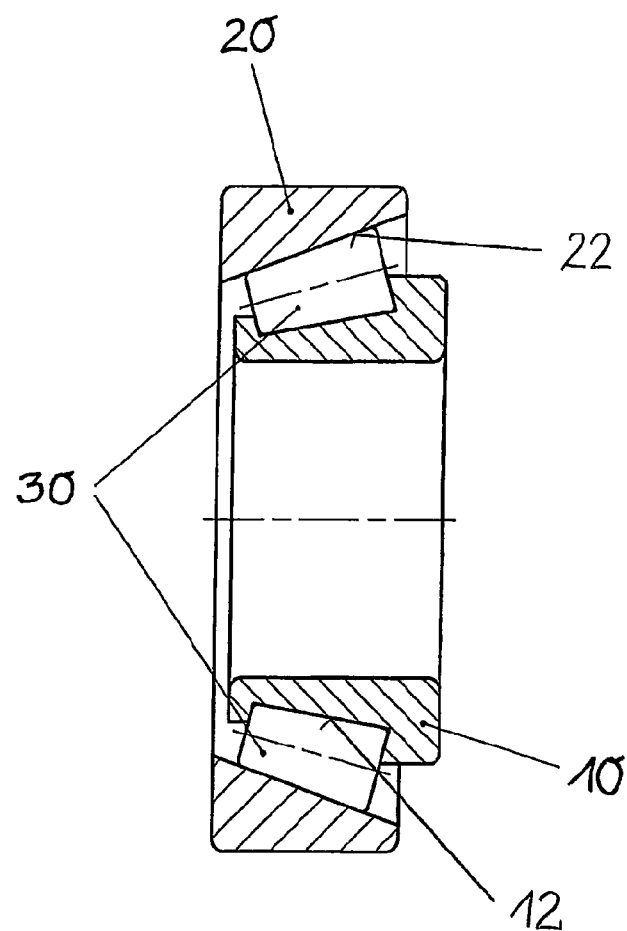
FIG. 1 shows a tapered roller bearing assembly.
Figure 2:
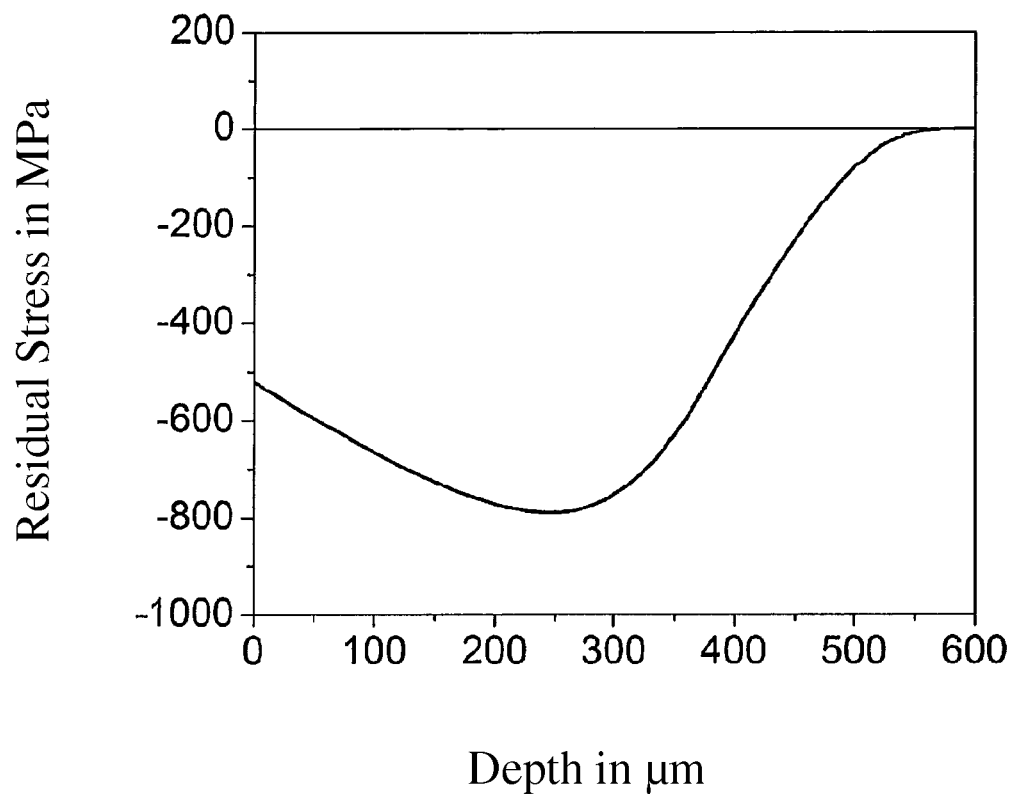
FIG. 2 shows a schematic diagram of a typical compressive residual stress profile of a raceway element of the tapered roller bearing of FIG. 1.

The raceway element of the rolling-element bearing assembly preferably has compressive residual stresses of at least 400 MPa below the surface of the raceway up to a depth of at least 200 µm. However, the maximum of the compressive residual stress falls between 500 MPa and 800 MPa up to preferably not substantially over 1000 MPa. However, up to a depth of 100 µm the compressive residual stresses fall at least at a value of 40% of the maximum value of the compressive residual stress. In this way a more uniform residual-stress state can be achieved with increasing depth than with known methods of case-working or cold-working. This in turn results in an increased service life of the raceway element and thus of the rolling-element bearing assembly under the stated operating or loading conditions. In FIG. 2, for example, an advantageous profile of the compressive residual stress of a raceway element is illustrated, plotted against the depth with respect to the raceway. The profile has been generated using a method according to an exemplary embodiment of the invention by deep rolling using two differently dimensioned rolling elements. It will be clear that a residual stress of approximately 500 MPa can already be built up at a very shallow depth below the raceway, which then drops off nearly linearly up to a maximum value of approximately 800 MPa at a depth of approximately 250 µm.

The use of ball- and/or roller-type rolling elements is advantageous, wherein however other geometries can also be used. In addition, the two rolling steps can also be effected using rolling elements of different basic shapes. With cylindrical rolling elements, the diameter of the smaller rolling element preferably falls between 1 and 3 mm, and the diameter of the larger rolling element falls between 6 and 9 mm, particularly preferably between 7 and 8 mm.

Methods according to exemplary embodiments of the invention can be advantageously used with all known bearing types, i.e. in addition to tapered-roller-, in particular also with cylindrical-, ball-, and spherical-roller-bearings, wherein the requirements of the profile of the compressive residual stresses can be differently satisfied depending on the field of application of the rolling-element bearing. However, profiles which are much more targeted to the requirements can be generated than with known methods.

REFERENCE NUMBER LIST

10, 20 Raceway element
12, 22 Rolling raceway
30 Rolling elements

The invention claimed is:

1. A method for manufacturing a raceway element of a bearing assembly, comprising:
   providing a raceway element including a raceway surface,
   hardening the raceway surface by at least partially heating the raceway element,
   deep rolling the raceway surface using a first rolling element, and
   deep rolling the raceway surface using a second rolling element, wherein the second rolling element has at least one different dimension as compared to the first rolling element.

2. The method according to claim 1, wherein at least one of the first and second rolling elements has a spherical shape.

3. The method according to claim 1, wherein after the deep rolling using the second rolling element, a material-ablating step is carried out, such that at least portion of the raceway surface is removed.

4. The method according to claim 3, wherein less than 50 µm of the raceway surface is removed in the material-ablating step.

5. The method according to claim 3, wherein after the deep rolling using the second rolling element, a honing-process or a gentle-grinding process, and a thermal post-treatment are carried out.

6. The method according to claim 5, wherein the thermal post-treatment is carried out at a temperature that is less than a tempering or annealing temperature of the hardening step.

7. The method according to claim 1, wherein both of the first and second rolling elements have a spherical shape or a cylindrical shape.

8. The method according to claim 7, further comprising:
after the deep rolling using the second rolling element, ablating at least a portion of the raceway surface.

9. The method according to claim 8, wherein 50 µm or less of the raceway surface is removed in the ablating step.

10. The method according to claim 9, further comprising:
after the ablating step, honing or grinding the raceway surface, and
then carrying out a thermal post-treatment on the raceway element.

11. The method according to claim 10, wherein the thermal post-treatment is carried out at a temperature that is less than a tempering or annealing temperature utilized in the hardening step.

12. The method according to claim 11, wherein the deep rolling steps are performed such that:
compressive residual stresses of at least 400 MPa are present at a depth from the raceway surface of 200 µm or less, and
between the raceway surface and a depth of 100 µm from the raceway surface, the amount of the compressive residual stresses changes by 500 MPa or less.

13. The method according to claim 12, wherein the deep rolling steps are performed such that the compressive residual stress has a maximum value between 500 and 1000 MPa.

14. The method according to claim 13, wherein the deep rolling steps are performed such that:
from the raceway surface to a depth of 200 µm, the compressive residual stress has a minimum between 400 and 500 MPa.

15. The method according to claim 14, wherein the first rolling element has a diameter of 1-3 mm and the second rolling element has a diameter between 6-9 mm.

* * * * *